United States Patent
Sada et al.

(10) Patent No.: US 7,192,675 B2
(45) Date of Patent: Mar. 20, 2007

(54) LITHIUM POLYMER SECONDARY BATTERY

(75) Inventors: Tsutomu Sada, Otsu (JP); Kazunari Takeda, Tsurugashima (JP); Yumiko Takashima, Tano-gun (JP); Naoto Nishimura, Kashihara (JP); Takehito Mitate, Yamatotakada (JP); Kazuo Yamada, Kitakatsuragi-gun (JP); Motoaki Nishijima, Gose (JP); Naoto Torata, Kashihara (JP)

(73) Assignee: Sharp Kabushiki Kaisha, Osaka (JP)

( * ) Notice: Subject to any disclaimer, the term of this patent is extended or adjusted under 35 U.S.C. 154(b) by 502 days.

(21) Appl. No.: 10/381,885

(22) PCT Filed: Sep. 28, 2001

(86) PCT No.: PCT/JP01/08523

§ 371 (c)(1),
(2), (4) Date: Sep. 3, 2003

(87) PCT Pub. No.: WO02/27855

PCT Pub. Date: Apr. 4, 2002

(65) Prior Publication Data

US 2004/0048159 A1    Mar. 11, 2004

(30) Foreign Application Priority Data

Sep. 29, 2000   (JP) .............................. 2000-297762

(51) Int. Cl.
*H01M 10/40*   (2006.01)
*H01M 4/58*    (2006.01)

(52) U.S. Cl. .................. 429/306; 429/309; 429/231.95

(58) Field of Classification Search ................ 429/306, 429/307, 309, 231.4, 231.95
See application file for complete search history.

(56) References Cited

U.S. PATENT DOCUMENTS 6,576,371 B1 *   6/2003   Yasuda et al. .............. 429/309

FOREIGN PATENT DOCUMENTS

| JP | 6-96800 A    |   | 4/1994  |
|----|--------------|---|---------|
| JP | 8-329983 A   |   | 12/1996 |
| JP | 9-97617 A    |   | 4/1997  |
| JP | 10-270004 A  |   | 10/1998 |
| JP | 11317228 A   | * | 11/1999 |
| JP | 2000-90925 A |   | 3/2000  |
| JP | 2000156230 A | * | 6/2000  |

OTHER PUBLICATIONS

JPO-Web-site, machine translation of JP 09-097617A.*
JPO-Web-site, machine translation of JP 08-329983A.*
International Search Report mailed Dec. 25, 2001 in corresponding PCT Application No. PCT/JP01/08523.
English translation of International Preliminary Examination Report mailed Aug. 4, 2003 in corresponding PCT Application No. PCT/JP01/08523.

* cited by examiner

*Primary Examiner*—Gregg Cantelmo
(74) *Attorney, Agent, or Firm*—Nixon & Vanderhye P.C.

(57) ABSTRACT

A lithium polymer secondary battery which comprises a negative electrode, a positive electrode, and polymer electrolyte layers united respectively with the two electrodes and differing in viscoelastic behavior. In this battery, conformation to the expansion and shrinkage accompanying charge/discharge is easy and the interfacial resistance between each electrode and the polymer electrolyte is kept low.

4 Claims, 3 Drawing Sheets

LITHIUM POLYMER SECONDARY BATTERY

This application is a continuation of international application PCT/JP01/08523 filed 28 Sep. 2001 which designates the U.S.

FIELD OF THE INVENTION

This invention relates to a lithium secondary battery using an ion-conductive polymer. More specifically, it relates to a lithium polymer secondary battery comprising an anode having an electroactive substance comprised of a carbonaceous material capable of electrochemically insertion and release of lithium, a cathode having an electroactive substance comprised of a chalcogenide compound containing lithium, and a polymer electrolyte layer comprised of a matrix of an ion-conductive polymer retaining a nonaqueous electrolyte solution therein.

BACKGROUND ART

Lithium secondary batteries have a higher energy density in theory compared to other batteries and thus allow to manufacture a small and light-weight battery. Therefore, vigorous studies have been focussed thereon to develop a power source of portable electronic instruments. Particularly, performance of such instruments is even increasing in recent years and their power source is required concominantly therewith to exhibit better discharging characteristics even at a high load. In order to fulfill these requirements, various studies are in progress next to the prior art battery using nonaqueous electrolyte solutions referred to as lithium ion battery to develop a battery using a polymer electrolyte that functions both as the nonaqueous electrolyte solution and the polymer separator of the prior art battery. Much interest has been focussed to a lithium secondary battery using the polymer electrolyte because of its remarkable advantages such as the possibility of making the battery smaller and thinner in size and lighter in weight as well as leak free.

Generally, secondary batteries now available in the market such as lithium secondary batteries make use of a nonaqueous electrolyte solution prepared by dissolving an electrolyte salt in an organic solvent. The use of this solution is problematic because the solution is easily susceptible to leakage from the battery parts, dissolution of electrode substances or vaporization which may develop problems of long term reliability, spilling off in the sealing process and the like.

In order to improve these problems, lithium secondary batteries have been developed which make use of a polymer electrolyte macroscopically occurring as a solid. The polymer electrolyte consists of a porous matrix of an ion-conductive polymer impregnated with or retaining a non-aqueous electrolyte solution (a lithium salt solution in an aprotic polar organic solvent).

Microscopically the polymer electrolyte has a continuous phase of nonaqueous electrolyte solution therein and exhibits a high ion conductivity. This results in a low mechanical strength. The mechanical strength may be reinforced by including a separator (porous substrate) in the polymer electrode but another problem still remains to exsist.

The lithium secondary battery relies on intercalation or doping of lithium into an electroactive substance which results in expansion and shrinkage of the electroactive layer. If the polymer electrolyte fails to accommodate well the expansion/shrinkage, then physical contact between the electrode and the polymer electrolyte will become unsatisfactory to develop increased interfacial resistance therebetween. This adversely affect the battery perfomance including discharge and charge cycle characteristics of the battery.

JP-A-5012913 discloses that the ion conductivity and the elasticity of the polymer electrolyte of this type may well be balanced by increasing the ratio of nonaqueous electrolyte solution to ion-conductive polymer to 200% or higher and also increasing the elasticity and elongation of the polymer electrolyte greater than certain levels. Since greater elasticity levels mean greater strain per unit amount of stress, increased elasticity cannot accommodate both of expansion and shrinkage. In order to accommodate both expansion and shrinkage, it is necessary for the polymer electrolyte to have a cushon-like property.

Accordingly, the problem to be solved by the present invention is to provide a lithium secondary battery including a polymer electrolyte layer that can tolerate expansion and shrinkage of the electroactive substance layers and exhibit a buffering effect as a whole.

DISCLOSURE OF THE INVENTION

The present invention provides a lithium polymer secondary battery comprising an anode having an electroactive substance comprised of a carbonaceous material capable of electrochemically inclusion and release of lithium, a cathode having an electroactive substance comprised of a chalcogenide compound containing lithium, and a polymer electrolyte layer sandwiched between the cathode and the anode, wherein said polymer electrolyte layer is divided into a sub-layer integrally formed with said cathode and a sub-layer integrally formed with said anode, and wherein the sub-layers exhibit different viscoelastic behavior from each other.

In a preferred embodiment, the polymer electrolyte sub-layer on the cathode has an elasticity greater than that of the polymer electrolyte sub-layer on the anode. This is because the expansion/shrinkage of the electroactive substance is more remarkable in the cathode than in the anode and, therefore, a greater mechanical strength is required for the polymer electrolyte sub-layer on the cathode.

BEST MODE FOR CARRYING OUT OF THE INVENTION

Figure 1:
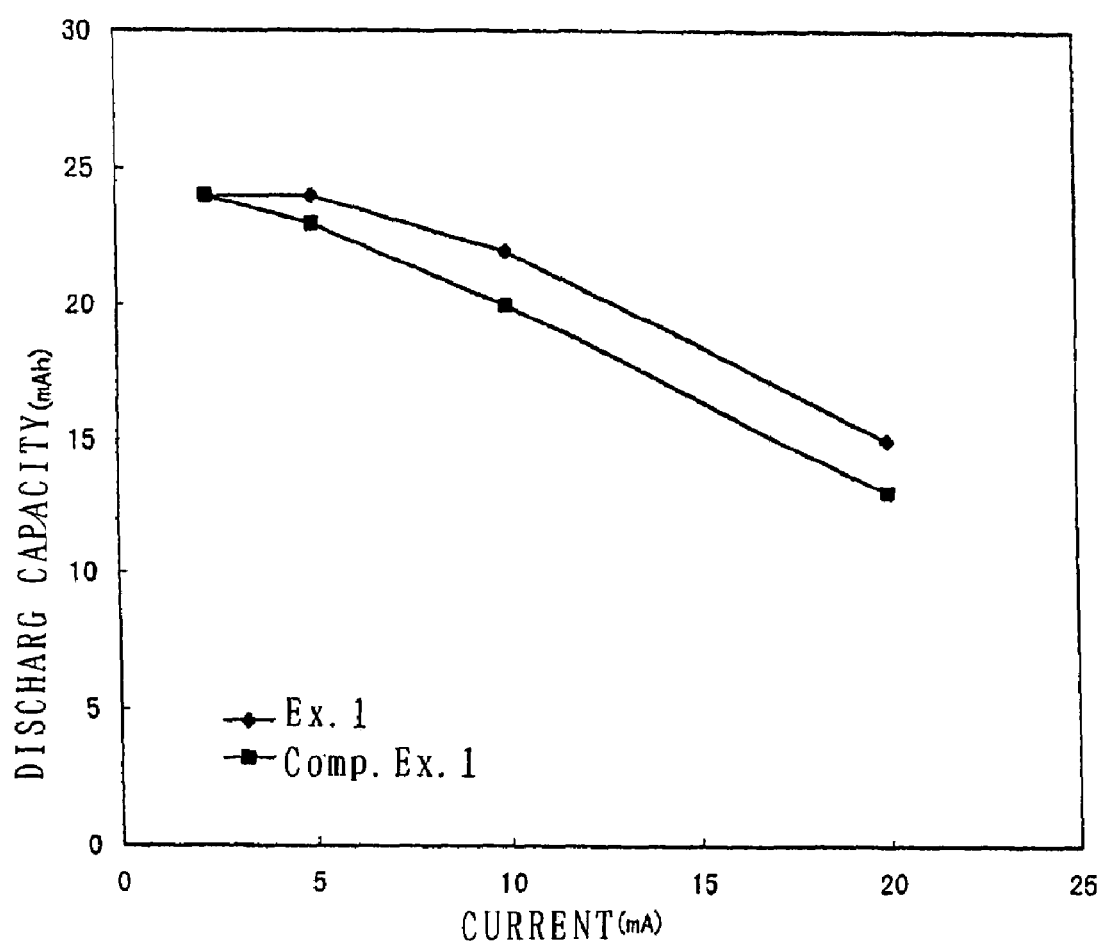
FIG. 1 is a graph showing the discharge capacity at different current levels of the battery according to Example 1 of the present invention in comparison with the battery according to Comparative Example 1.

The battery of the present invention may be manufactured by forming an ion-conductive polymer layer separately on a pre-fabricated cathode and anode and joining the layers together although the manufacturing process is not limited thereto.

Basically, the anode and cathode comprise a current collector in the form of a metal foil and an electroactive substance of the respective electrodes bound with a binder material. The materials of the collector foil include aluminum, stainless steel, titanium, copper, nickel and the like. Aluminum and copper are employed for the cathode and the anode, respectively in consideration of their electrochemical stability, ductility and economy.

Although metal foils are mainly shown herein as the form of anode and cathode collectors, other forms such as mesh, expanded metals, laths, perforated sheets or plastic films having a coating of an electron-conductive material may be employed although the form of collector is not limited thereto.

The electroactive substance of the anode is a carbonaceous material capable electrochemically inclusion and release of lithium. Typical examples thereof include particles (flakes, aggregates, fibers, whiskers, beads or ground particles) of natural or artificial graphite. Artificial graphite produced by graphitizing mesocarbon beads, mesophase pitch powder or isotropic pitch powder may also be used.

With regard to the electroactive substance used in the present invention, it is more preferable to use as the carbonaceous material graphite particles having attached to the surfaces thereof amorphous carbon particles. These particles may be obtained by dipping the graphite particles in a coal-based heavy oil such as pitch or a petroleum-based heavy oil and heating recovered graphite particles to a temperature above the carbonizing temperature to decompose the heavy oil, if necessary, followed by milling. Such treatment significantly retards the decomposing reaction of the nonaqueous electrolyte solution and the lithium salt occurring at the anode during the charge cycle to enable the charge and discharge cycle life to be improved and also the gas evolution due to the above decomposition reaction to be prevented. In the above carbonaceous material, micropores contributing to increase in BET specific surface area have been filled with the attached carbon particles derived from the heavy oil. The specific surface area thereof is generally below 5 $m^2/g$, preferably in the range between 1 to 5 $m^2/g$. Greater specific surface areas are not preferable because increased contacting surface area with the ion-conductive polymer makes undesired side reactions to be taken place more easily.

The cathodic electroactive substance to be used in the present invention in conjunction with the carbonaceous anodic active substance is preferably selected from a composite oxide of laminar or spinel structure represented by the formula: $Li_a(A)_b(B)_cO_2$ wherein A is a transition metal element;

B is an element selected from the group consisting of a non-metal or semi-metal element of group 3B, 4B and 5B of the periodic chart, an alkaline earth metal, Zn, Cu and Ti;

a, b and c are numbers satisfying the following relationship:

$0 < a \leq 1.15$ $0.85 \leq b+c \leq 1.30$, and $c > 0$

Typical examples of the composite oxides include $LiCoO_2$, $LiNiO_2$ and $LiCo_xNi_{1-x}O_2$ ($0<x<1$). Use of these compounds in conjunction with a carbonaceous material as an anodic electroactive substance is advantageous in that the battery exhibits a practically acceptable dynamic voltage even when the voltage variation generated by charging and discharging the carbonaceous material per se (about 1 volt vs. $Li/Li^+$), and that lithium ions necessary for charging and discharging the battery are already contained in the form of, for example, $LiCoO_2$ or $LiNiO_2$ before assembling the battery.

When preparing the anode and cathode, the respective electroactive substances may be combined, where necessary, with a chemically stable conductor material such as graphite, carbon black, acetylene black, carbon fiber or conductive metal oxides to improve the electron conductivity thereof.

The binder is selected among those thermoplastic resins which are chemically stable, soluble in a suitable solvent but hardly attacked with the nonaqueous electrolyte solution. A variety of such thermoplastic resins have been known. For example, polyvinylidene fluoride (PVDF) may preferably used since this resin is selectively soluble in N-methyl-2-pyrrolidone. Other examples of usable thermoplastic resins include polymers and copolymers of acrylonitrile, methacrylonitrile, vinyl fluoride, chloroprene, vinyl pyridine and its derivatives, vinylidene chloride, ethylene, propylene and cyclic dienes (e.g. cyclopentadiene, 1,3-cyclohexadiene). A dispersion of the binder resin may also be used in place of a solution.

The electrode may be produced by kneading the respective electroactive substances and, where necessary, the conductor material with a solution of the binder resin to prepare a paste, applying the paste on a metal foil using a suitable coater to form a film of uniform thickness, and compressing the film after drying. The proportion of the binder resin in the electroactive substance layer should be minimum and generally lies from 1 to 15% by weight. The proportion of the conductor material usually lies, when used, from 2 to 15% by weight of the electroactive substance layer.

The polymer electrolyte layer is formed on the respective electroactive substance layers thus prepared integrally therewith. The polymer electrolyte layer is comprised of a matrix of an ion-conductive polymer impregnated with or retaining a nonaqueous electrolyte solution containing a lithium salt. The polymer electrolyte layer occurs macroscopically in a solid state but microscopically retains a continuous phase of the lithium solution formed therein in situ. The polymer electrolyte layer of this type has an ion-conductivity higher than that of the corresponding polymer electrolyte free from the lithium solution.

The polymer electrolyte layer may be formed by polymerizing (heat polymerization, photopolymerization etc.,) a precursor monomer of the ion-conductive polymer in the form of a mixture with the nonaqueous electrolyte solution containing a lithium salt.

The monomer component of the above mixture which can be used for this purpose should include a polyether segment and also be polyfunctional in respect to the polymerization site so that the resulting polymer forms a three dimensional crosslinked gel structure. Typically, such monomers may be prepared by esterifying the terminal hydroxyl groups with acrylic or methacrylic acid (collectived called "(meth) acrylic acid"). As is well known in the art, polyether polyols are produced by addition-polymerizing ethylene oxide (EO) alone or in combination with propylene oxide (PO) using an initiator polyhydric alcohol such as ethylene glycol, glycerine or trimethylolpropane. A monofunctional polyether polyol (meth)acrylate may be used in combination with polyfunctional monomers.

The poly- and monofunctional monomers are typically represented by the following general formulas:

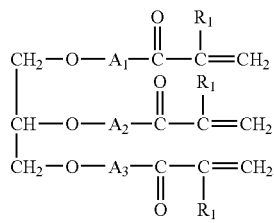

wherein $R_1$ is hydrogen or methyl;

$A_1$, $A_2$ and $A_3$ are each a polyoxyalkylene chain containing at least 3 ethylene oxide (EO) units and optionally some propylene oxide (PO) units such that PO/EO=0–5 and EO+PO≧35.

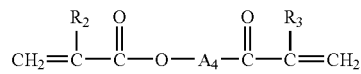

wherein $R_2$ and $R_3$ are hydrogen or methyl;

$A_4$ is a polyoxyalkylene chain containing at least 3 EO units and optionally some PO units such that PO/EO=0–5 and EO+PO≧10.

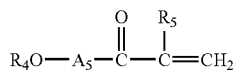

wherein $R_4$ is a lower alkyl, $R_5$ is hydrogen or methyl, and $A_5$ is a polyoxyalkylene chain containing at least 3 EO units and optionally some PO units such that PO/EO=0–5 and EO+PO≧3.

The nonaqueous electrolyte solution is prepared by dissolving a lithium salt in a nonpolar, aprotic organic solvent. Non-limitative examples of the lithium salt solutes include $LiClO_4$, $LiBF_4$, $LiAsF_6$, $LiPF_6$, LiI, LiBr, $LiCF_3SO_3$, $LiCF_3CO_2$, $LiNC(SO_2CF_8)_2$, $LiN(COCF_3)_2$, $LiC(SO_2CF_3)_2$, LiSCN and mixtures thereof.

Non-limitative examples of the organic solvents include cyclic carbonate esters such as ethylene carbonate (EC) or propylene carbonate (PC); straight chain carbonate esters such as dimethyl carbonate (DMC), diethyl carbonate (DEC) or ethyl methyl carbonate (EMC); lactones such as γ-butyrolactone (GBL); esters such as methyl propionate or ethyl propionate; ethers such as tetrahydrofuran and its derivatives, 1,3-dioxane, 1,2-dimethoxyethane, or methyl diglyme; nitrites such as acetonitrile or benzonitrile; dioxolane and derivatives thereof; sulfolane and derivatives thereof; and mixtures of these solvents.

Since the polymer electrolyte on the electrode, particularly on the carbonaceous material of the anode is required to contain a nonaqueous electrolyte solution of which side reactions with the graphite-based carbonaceous material are retarded, it is preferable to use a solvent system consisting primarily of EC and another solvent selected from PC, GBL, EMC, DEC or DMC. For example, a nonaqueous electrolyte solution containing 3 to 35% by weight of a lithium salt dissolved in the above solvent mixture containing 2 to 50% by weight of EC exhibits a satisfactory ion conductivity even at low temperatures.

The proportion of the nonaqueous solution in the mixture with the precursor monomer should be large enough to maintain the solution as continuous phase in the crosslinked polymer electrolyte layer but should not be so excessive to undergo phase separation and bleeding of the solution from the gel. This can be accomplished by the ratio of the monomer to the electrolyte solution generally within a range from 30/70 to 2/98, preferably within a range from 20/80 to 2/98 by weight.

The polymer electrolyte layer may optionally include a porous substrate as a support member. Such substrate may be either a microporous membrane made from a polymer which is chemically stable in the nonaqueous electrolyte solution e.g. polypropylene, polyethylene or polyester, or a sheet (i.e. paper or nonwoven fabric) made from fiber of such poymers. It is preferable, that the substrate has a air permeability from 1 to 500 sec./$cm^3$ and can retain the polymer electrolyte therein at a substrate: polymer electrolyte ratio from 91/9 to 50:50. This is necessary to achieve an optimum balance between the mechanical strength and the ion conductivity.

When the substrate is not used, the polymer electrolyte layer integral with the respective electrodes may be fabricated by casting the mixture of the precursor monomer and the nonaqueous electrolyte solution on the respective electroactive substance layers to form a film and polymerization the monomer in situ. Then both electrodes are joined together with their polymer electrolyte layers facing inwardly.

When used, the substrate is applied on the electroactive substance layer of either one of the electrodes. Then the mixture of the precursor monomer and the electrolyte solution is cast on the substrate followed by polymerization of the monomer in situ to form the polymer electrolyte layer integral with the substrate and the electrode. This electrode is joined together with the other electrode including the polymer electrolyte layer free of the substrate formed as above with their polymer electrolyte layers facing inwardly.

The above methods are preferred since they insure to form the polymer electrolyte layer integral with the electrode and the substrate, when used, in a simple manner.

The mixture of the precursor of ion-conductive polymer (monomer) and the nonaqueous electrolyte solution containing a lithium salt contains a suitable polymerization initiator depending on the polymerization method, e.g. a peroxide type or azo type initiator for heat polymerization and a photoinitiator such as acetophenone, benzophenone or phosphine series for photopolymerization. The polymerization initiator may be used in an amount from 100 to 1,000 ppm and should not be used in excess.

According to the present invention, the polymer electrolyte layers (sub-layers), formed on the cathode and anode, respectively have different viscoelastic behavior from each other. Generally the polymer electrolyte is a viscoelastic mass having both properties similar to a genuine elastic solid in which the amount of strain is proportional to the amount of stress applied and properties similar to a Newton's viscous liquid in which the speed of deformation is proportional to the amount of stress applied. Therefore, when the polymer electrolyte is tested for the stress-strain (elongation) relationship at a constant tensile speed, it behaves like a elastic solid until it reaches a yielding point and thereafter it behaves like a viscous liquid so that it deforms largely in response to a small increase in the amount of stress before break. In this test, the larger the amount of exerted energy before break, the larger the toughness of the test material.

The above amount of energy may be estimated from the modulus of elasticity of the test material.

In case of the polymer electrolyte, the modulus of elasticity is a function of the crosslinking density thereof. Therefore, gelled polymer electrolytes having different modulus of elasticity levels may be produced, for example, by varying monomer compositions of the ion-conductive polymer at a constant ratio of matrix polymer/nonaqueous electrolyte solution. Accordingly, a polymer gel having a relatively high modulus of elasticity may be obtained, for example, by selecting a monomer composition including a relatively large proportion of a monomer having a large number of functionality with regard to polymerizable groups. This method is merely one of preferred exemplifying methods and other methods for producing polymer electrolytes having different viscoelastic properties would be obvious to one skilled in the art.

In a preferred embodiment, the polymer electrolyte sub-layer on the cathode has a modulus of elasticity in a range from $10^4$ to $10^6$ dyne/cm$^2$ and the polymer electrolyte sub-layer on the anode has a modulus of elasticity in a range from $10^3$ to $10^6$ dyne/cm$^2$ and the modulus of elasticity of the sub-layer on the cathode is at least 10% greater than that of the sub-layer on the anode. The polymer electrolyte layer as a whole can accommodate well the expansion and shrinkage of electroactive substances under the above conditions.

EXAMPLE

The following Examples are for illustrative purpose only and not intended to limit the scope of the present invention thereto.

Example 1

1) Fabrication of Anode

As a carbonaceous material, a particulate graphite having amorphous carbon microparticles attached to the surfaces of graphite particles was used. The graphite particles have a d002 value of 0.336 nm determined according to the large angle X-ray diffraction method, an Lc value of 100 nm, an La value of 97 nm and a BET specific surface area of 2 m$^2$/g.

A blend of 100 weight parts of the above carbonaceous material and 9 weight parts of polyvinylidene fluoride (PVDF) was kneaded with an amount of N-methyl-pyrrolidone (NMP). The resulting paste was applied onto a rolled copper foil of 20 μm thickness, dried and compressed. The surface area of the cathode was 9 cm$^2$ and the thickness thereof was 85 μm.

2) Nonaqueous Electrolyte Solution/Monomer Mixture

LiBF$_4$ was dissolved at a concentration of 1.0 mol/L in a mixture of ethylene carbonate (EC):propylene carbonate (PC): γ-butyrolactone (GBL): ethyl methyl carbonate (EMC)=30:20:30:20 by volume.

To 95 weight parts of this solution were added 2.5 weight parts of a trifunctional polyether polyol triacrylate (MW=7500–9000) of the formula:

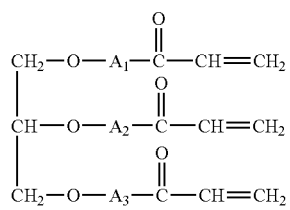

wherein A$_1$, A$_2$ and A3 are each polyoxyalkylene chain containing at least 3 EO units and at least one PO unit in PO/EO ratio of 0.25; and 2.5 weight parts of triethylene glycol methyl ether acrylate of the formula:

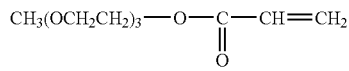

Then 1,000 ppm of 2,2-dimethoxy-2-phenylacetophenone (DMPA) was added to prepare a polymerization liquid.

3) Fabrication of Polymer Electrolyte Layer Integral with Anode and Separator Substrate The above polymerization liquid was cast on the electro-active substance layer of the anode.

A polyester nonwoven fabric having an air permeability of 380 sec/cm$^3$, a thickness of 20 μm and an area of 10 cm$^2$ was placed on the anode and the above polymerization liquid was poured thereon in an amount sufficient to reach a fabric: liquid ratio=90:10 by weight. Then the anode-fabric stack was irradiated with UV radiation of 365 nm wavelength at an intensity of 30 mW/cm$^2$ for 3 minutes to form a gelled polymer electrolyte layer integrally with the anode and the nonwoven fabric. The thickness of the polymer electrolyte layer was 20 μm.

4) Fabrication of Anode 100 weight parts of LiCoO$_2$ having an average particle size of 7 μm and 5 weight parts of acetylene black, and 5 weight parts of PVDF were blended and kneaded with an amount of NMP. The resulting paste was applied on a rolled aluminum foil of 20 μm thickness, dried and compressed. The area and the thickness of cathode were 80 μm and 9 cm$^2$, respectively.

5) Polymerization Liquid on Cathode

LiBF$_4$ was dissolved at a concentration of 1.0 mol/L in a mixture of ethylene carbonate (EC): propylene carbonate (PC): γ-butyrolactone (GBL): ethyl methyl carbonate (EMC)=30:20:30:20 by volume.

To 90 weight parts of this solution were added 5 weight parts of a trifunctional polyether polyol triacrylate as used on the anode side and 1,000 ppm of DMPA to obtain a polymerization liquid.

6) Fabrication of Polymer Electrolyte Layer on Cathode

The above polymerization liquid was cast on the cathode and irradiated with UV radiation of 365 nm wavelength at an intensity of 30 mW/cm$^2$ for three minutes to fabricate a polymer electrolyte layer integrally with the cathode. The thickness of the polymer electrolyte layer was 10 μm.

6) Assembly of Battery.

The cathode and the anode as prepared above were joined together with their polymer electrolyte layers facing inwardly to assemble a battery having a total thickness of 190 μm.

Comparative Example 1

Example 1 was repeated except that the polymer electrolyte sub-layer of Example 1 was used in both of the cathode and the anode.

The polymer electrolyte sub-layer of the anode in Example 1 (same as the polymer electrolyte sub-layers on the cathode and the anode in Comparative Example 1) was tested for the modulus of elasticity according to the method described below. The same test was also conducted for the cathode polymer electrolyte sub-layer on the cathode of Example 1.

The respective precursor liquids were cast on a stainless steel foil and irradiated with UV radiation of 365 nm wavelength at an intensity of 30 mW/cm$^2$ for 3 minutes to form a gelled polymer electrolyte sheet having a thickness of 500 μm. A sample was taken from this sheet and the modulus of elasticity thereof was determined using a dynamic viscoelastometer. The results are shown in Table 1 below.

Evaluation of Battery Performance:

The batteries of Example 1 and Comparative Example 1 were charged at a constant current of 4.0 mA until the battery voltage reached 4.1 V and the charged at a constant voltage for a total pre-charge time of 12 hours. The charged batteries were then discharged at different constant current levels of 2, 3, 5, 10 and 20 mA until the battery voltage decreased to 2.75 V. The discharge capacities at different discharge current levels are shown in the graph of FIG. 1.

Figure 2:
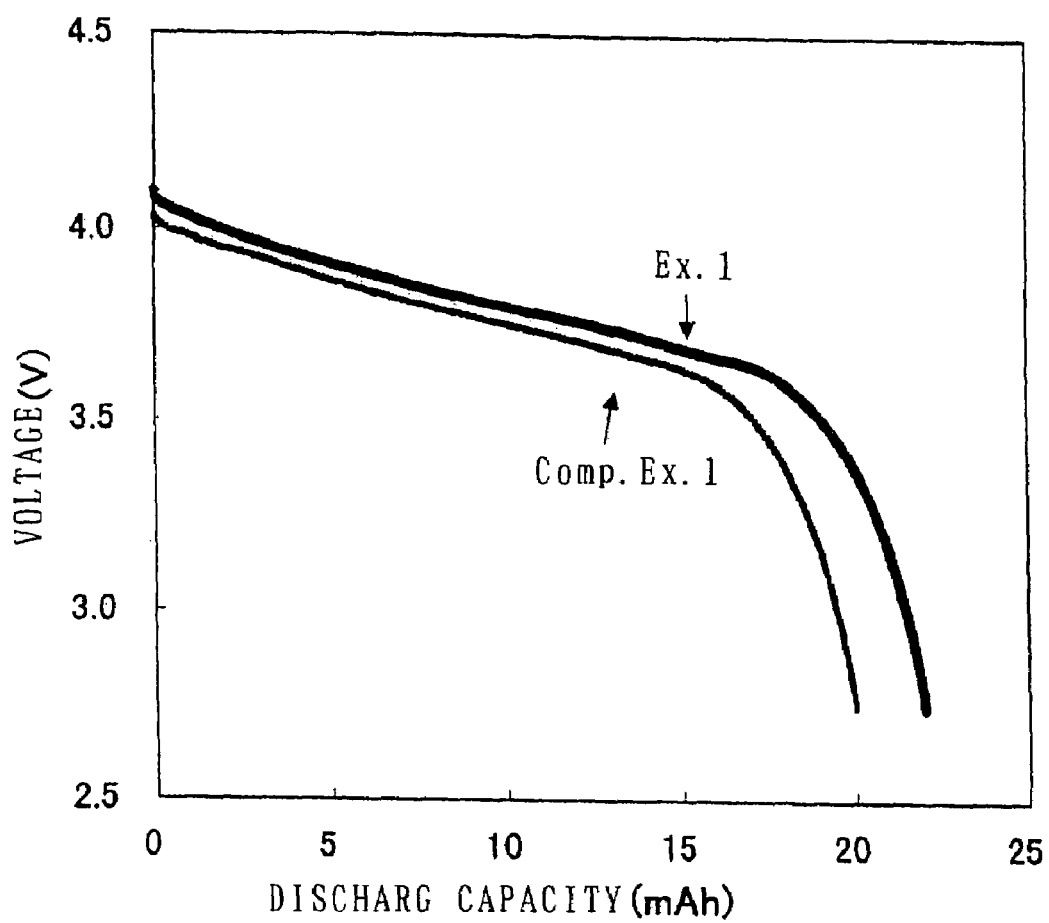
FIG. 2 is a graph showing the discharge curve at a constant current of 10 mA of the battery according to Example 1 of the present invention in comparison with the battery according to Comparative Example 1.

Similarly, the batteries were charged under same conditions as above and were discharged at a constant current level of 10 mA until the battery voltage decreased to 2.75 V. The discharge curves of the respective batteries are shown in the graph of FIG. 2.

Figure 3:
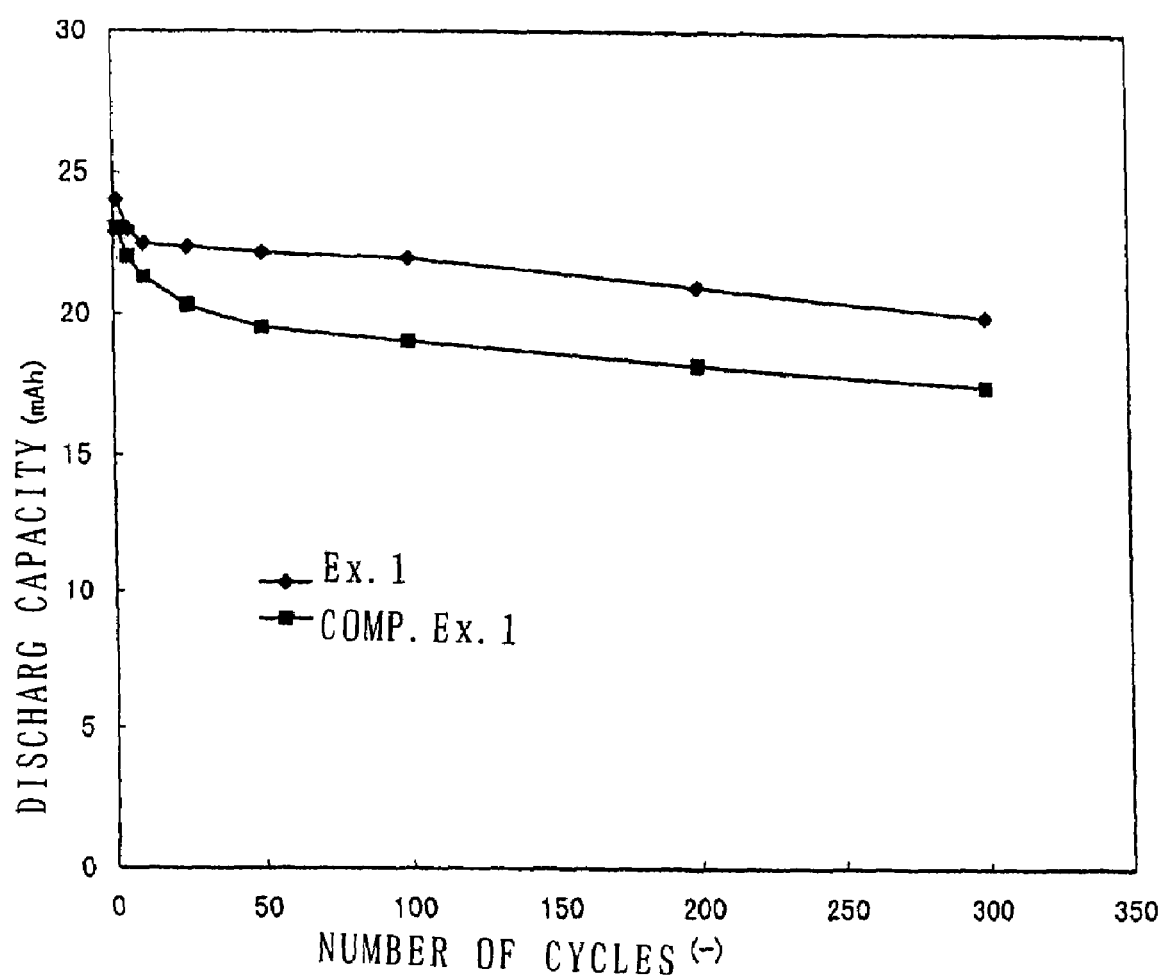
FIG. 3 is a graph showing the discharge curve of the battery according to Example 1 of the present invention in comparison with the battery according to Comparative Example 1.

Similarly, the batteries were charged under same condition as above and then discharged at a constant current level of 2.3 mA until the battery voltage reached 2.75 V. This charge-discharge cycle was repeated a number of times for testing the variation in discharge capacity. The results are shown in the graph of FIG. 3.

As the results of these tests show, the battery of Example 1 is superior to the battery of Comparative Example 1 in terms of the discharge capacity at different current levels, the discharge capacity characteristics under a high load and the charge-discharge cycling characteristics. It is postulated that these results are attributed to the fact that the polymer electrolyte layer of the battery of Example 1 as a whole can easily accommodate the expansion/shrinkage of the cathode and anode during the charge and discharge cycles compared to the polymer electrolyte layer of the battery of Comparative Example 1 to keep the interfacial resistance between the polymer electrolyte layer and the electrode at a minimum level.

Separately, the batteries of Example 1 and Comparative Example 1 were tested, respectively for the number of incident of microshort circuit in 20 batteries immediately after manufacutre. The results are also shown in Table 1. It is also postulated that the fewer number of incident of microshort circuit in the battery of Example 1 compared to the battery of Comparative Example 1 is attributed to the improved mechanical property of the polymer electrolyte layers a whole.

TABLE 1

| Item | Example 1 | | Comp. Ex. 1 | |
| --- | --- | --- | --- | --- |
| | Cathode | Anode | Cathode | Anode |
| Modulus of elasticity, 25° C. (dyne/cm$^2$) | $2.18 \times 10^5$ | $8.9 \times 10^3$ | $8.9 \times 10^3$ | $8.9 \times 10^3$ |
| Incident of microshort circuit | 0/20 | | 2/20 | |

The invention claimed is:

1. A lithium secondary battery comprising an anode having an electroactive substance comprised of a carbonaceous substance capable of electrochemically inclusion and release of lithium, a cathode having an electroactive substance comprised of a chalcogenide compound containing lithium, and a polymer gel electrolyte layer sandwiched between the cathode and the anode, wherein said polymer gel electrolyte layer comprises a matrix of an ion-conductive polymer of polyether polyol (meth)acrylate retaining a non-aqueous electrolyte solution therein, wherein said polymer gel electrolyte layer is divided into a first sub-layer integrally formed with said cathode and a second sub-layer integrally formed with said anode, and wherein the precursor monomer of said ion-conductive polymer in said first sub-layer has a polymerizable functionality of 3, and the precursor monomer of said ion-conductive polymer in said second sub-layer has a polymerizable functionality less than 3, the precursor monomer of said ion-conductive polymer in said first sub-layer being a trihydric polyether polyol triacrylate and the precursor monomer of said ion-conductive polymer in said second sub-layer being a mixture of said trihydric polyether polymer triacrylate with triethylene glycol monomethyl ether acrylate at a weight ratio of 1:1.

2. The lithium polymer secondary battery according to claim 1 wherein the solvent of said nonaqueous electrolyte solution is selected from ethylene carbonate, propylene carbonate, ethyl methyl carbonate, dimethyl carbonate, diethyl carbonate, r-butyrolactone or a mixture thereof.

3. The lithium polymer secondary battery according to claim 1 wherein said electroactive substance of said anode is a particulate graphite having amorphous carbon attached to the surfaces thereof.

4. The lithium polymer secondary battery according to claim 1 wherein said polyether polyol poly(methacrylate) contains a plurality of polyether chains consisting of an ethylene oxide (EO) unit and optionally a propylene oxide (PO) unit.

* * * * *